C. E. MENTZER.
NUT LOCK.
APPLICATION FILED SEPT. 2, 1913.
1,167,774.
Patented Jan. 11, 1916.
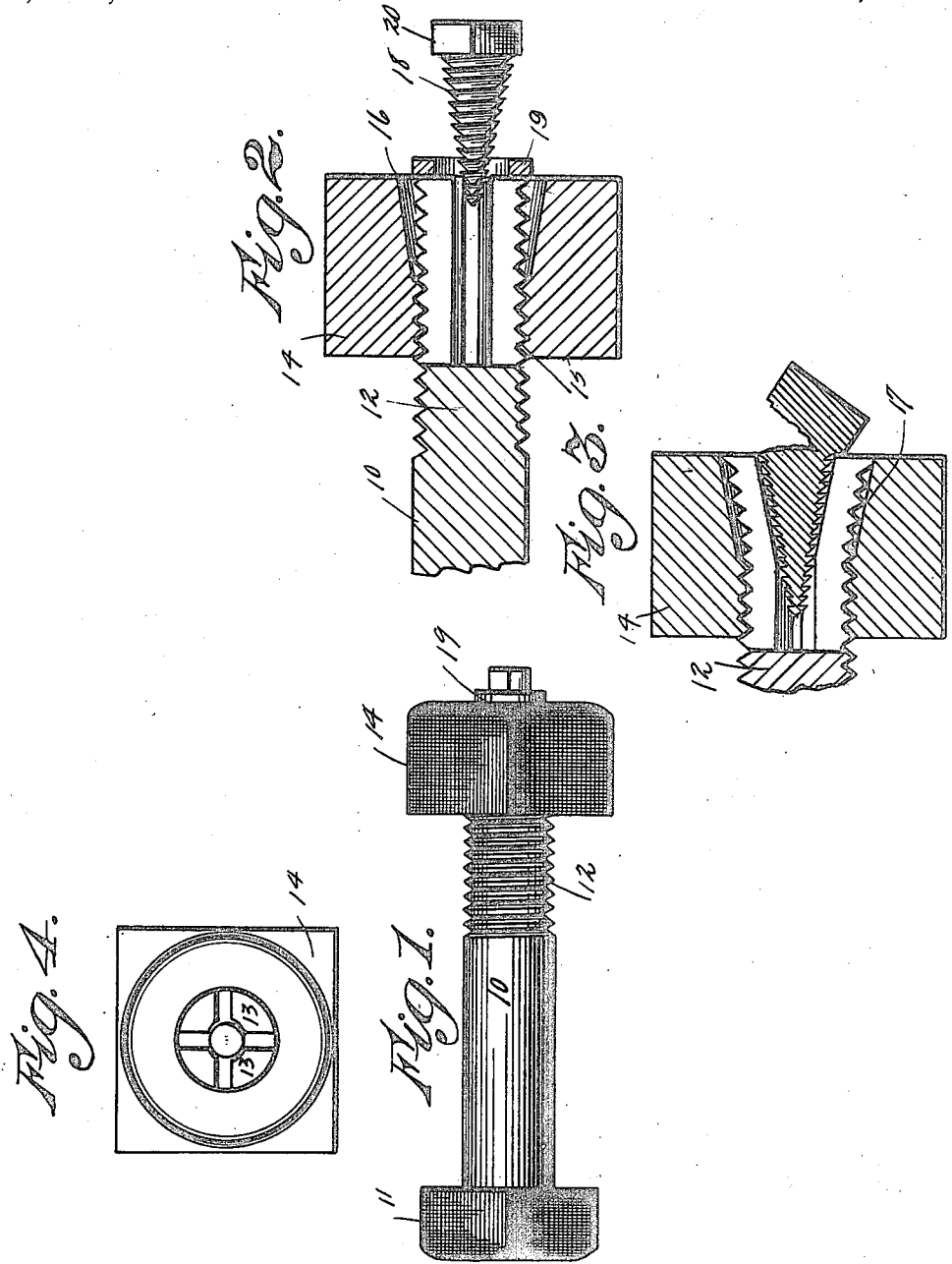

UNITED STATES PATENT OFFICE.

CLAUDE E. MENTZER, OF DES MOINES, IOWA, ASSIGNOR OF ONE-FOURTH TO LEON GOODMAN AND ONE-FOURTH TO LOUIS EVANS, BOTH OF DES MOINES, IOWA.

NUT-LOCK.

1,167,774.  Specification of Letters Patent.  Patented Jan. 11, 1916.

Application filed September 2, 1913. Serial No. 787,800.

*To all whom it may concern:*

Be it known that I, CLAUDE E. MENTZER, a citizen of the United States, and resident of Des Moines, in the county of Polk and State of Iowa, have invented a certain new and useful Nut-Lock, of which the following is a specification.

The object of my invention is to provide a nut lock of simple, durable and inexpensive construction.

More particularly, it is my object to provide a nut lock comprising a bolt, the screw-threaded end of which is slit in two directions to make four separate parts, and a nut having the opening in its outer end beveled from the outside inwardly to the screw-threaded portion of said nut and a means forced into the end of said bolt for spreading it.

My invention consists in certain details, in the construction, combination and arrangement of the various parts of the device, whereby the objects contemplated are attained, as hereinafter more fully set forth, pointed out in my claim and illustrated in the accompanying drawings, in which:

Figure 1 shows a side elevation of a nut lock embodying my invention. Fig. 2 shows a central, vertical, sectional view through a bolt and nut embodying my invention, showing the screw at the beginning of the operation of locking the nut. Fig. 3 shows a central, vertical, sectional view of the completed nut lock with the head of the screw partially broken off, and Fig. 4 shows an end view of the nut, showing the beveled opening therein.

In the accompanying drawings I have used the reference numeral 10 to indicate the shank of an ordinary bolt having the head 11 and the screw-threaded portion 12. The screw-threaded end of the bolt is split longitudinally to form four equal parts 13. For use with the bolt I use a nut 14 of peculiar form. The nut 14 is provided with a screw-threaded opening 15 which may extend approximately half way through the nut. At one end the opening 15 is beveled outwardly at 16 and the beveled opening 16 may be smooth or otherwise.

For locking or riveting the nut on the bolt, it is screwed on the bolt as shown in Fig. 2, until the parts 13 are received in the beveled opening 16. A pin or screw 18 is then driven into the end of the bolt between the parts 13 or if properly formed may be driven in for a short distance and is then screwed into the end of the bolt. As the screw 18 is forced into the bolt, the portions 13 will be forced outwardly, thereby filling the beveled opening 16, as shown in Fig. 3. A washer 19 may be placed around the opening 16 before the screw is started if desired. When the screw has moved inwardly as far as is desired and until the parts 13 are spread so that they and the screw 18 fill the beveled opening 16, the lock is completed. If desired, the washer 19 and the head 20 on the screw 18 may be left as shown in Fig. 1. If, however, it is desired to leave a smooth face, the head of the screw may be knocked or broken off, as shown in Fig. 3 and the surface of the outside of the nut at the end of the bolt may be left without any projecting parts.

The member 18 is preferably provided with screw threads or notches formed like those of a rasp, as shown in Figs. 2 and 3, so as to give the member 18 the operation of a barbed point. I am aware that smooth devices have been used to spread the end of the bolt but such devices slip out while my barbed screw will never come out.

The advantages of a nut lock of this kind are obvious from the foregoing description. The bolt is absolutely locked in the nut and can never be removed by any ordinary jar or vibration nor by malicious parties or others without the use of special tools or machinery. Especially on account of the construction of the beveled opening 16, the operation of locking the nut on the bolt is comparatively easy and simple. Even if by any possible chance the screw 18 should be removed from the end of the bolt, the bolt cannot be withdrawn from the nut.

I claim as my invention:

In a device of the class described, a bolt, having a screw threaded end split longitudinally into a plurality of parts, a nut having an opening through it, a portion of said opening being screw threaded, and said opening being tapered outwardly from said screw threaded portion to the surface of the
5 nut, said screw threaded end of said bolt being received in said opening in the nut, a barbed screw received in the split end of said bolt for forcing the parts of the bolt into the larger part of said beveled opening.

Des Moines, Iowa, August 20, 1913.

CLAUDE E. MENTZER.

Witnesses:
C. B. ORWIG,
S. ROBINSON.